US006270869B1

(12) United States Patent
Zeiter et al.

(10) Patent No.: US 6,270,869 B1
(45) Date of Patent: Aug. 7, 2001

(54) COLD FORMABLE LAMINATE FILMS

(75) Inventors: Patrik Zeiter, Zurich (CH); Erwin Pasbrig, Singen (DE); Hans Peter Breitler, Kreuzlingen (CH)

(73) Assignee: Alusuisse Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/448,980

(22) Filed: Nov. 24, 1999

(30) Foreign Application Priority Data

Dec. 2, 1998 (CH) .................................................. 2396/98

(51) Int. Cl.⁷ ..................................................... B23B 15/08
(52) U.S. Cl. ........................ 428/35.8; 428/35.7; 428/35.9; 428/36.7; 428/458; 428/474.4; 206/531; 206/532
(58) Field of Search ................................ 428/458, 474.4, 428/35.7, 35.8, 35.9, 36.7; 206/531, 532

(56) References Cited

U.S. PATENT DOCUMENTS 5,589,275 * 12/1996 Breitler et al. .

FOREIGN PATENT DOCUMENTS 0414636 8/1990 (EP) .
0845350 6/1998 (EP) .
WO 87/95563 9/1987 (WO) .

* cited by examiner

Primary Examiner—Richard Weisberger
(74) Attorney, Agent, or Firm—Fisher, Christen & Sabol

(57) ABSTRACT

Cold-formable laminate film, for example, for manufacturing push-through or blister packs or the base parts and for forms of packaging or shaped parts for packaging medical instruments and applicators, containing a barrier layer that is impermeable to water vapor and gases and a plastic layer on both sides of the barrier layer. The laminate film exhibits a layered structure containing in the following order:

Figure 1:
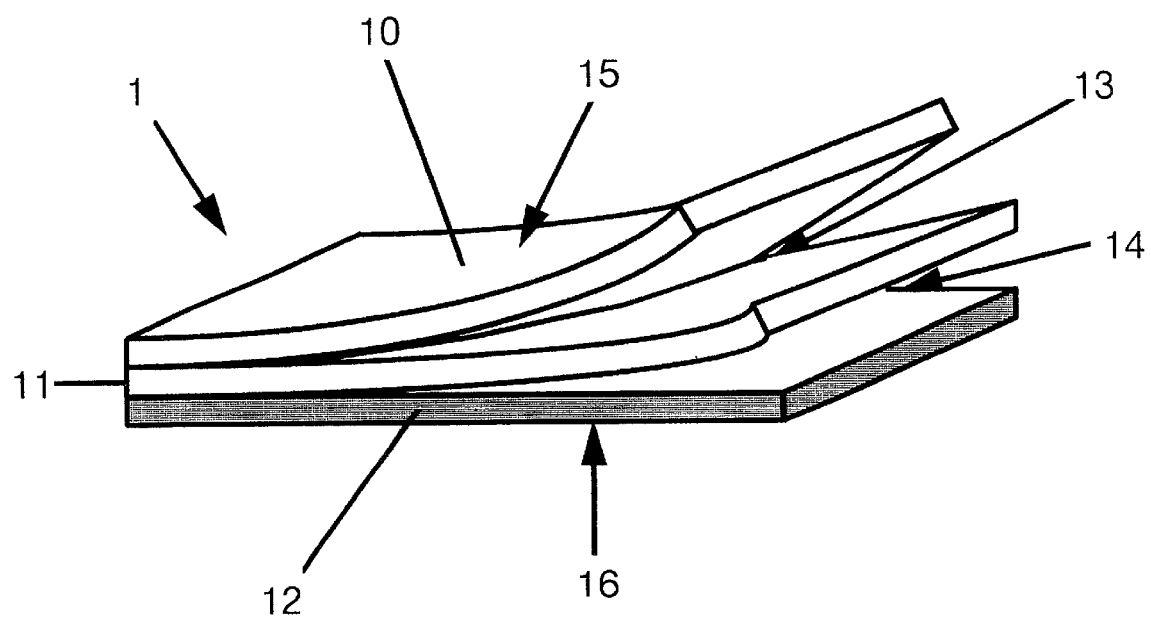

(a) a plastic layer in the form of a film of the following type, namely, polychloride, polyester, polypropylene, cycloolefin-copolymer or a cast film of polyvinylchloride or polypropylene;

(b) a metal foil such as an aluminium foil; and (c) an oriented polyamide film having a thickness of 25 to 2 μm.

The free sides of the first and/or the second plastic film may feature a sealing layer or the first and/or the second plastic films may be sealable. The laminate films may, for example, be processed into forms of packaging by a deepening process such as stretch drawing, i.e., by mechanical cold forming using a stamp type tool. During stretch drawing the laminate film is held securely between the die and the holder while the shaping tool forces the laminate into the desired form by stretch forming it.

17 Claims, 1 Drawing Sheet

COLD FORMABLE LAMINATE FILMS

BACKGROUND OF THE INVENTION

1. Field of the Invention

The present invention relates to cold-formable laminate films containing a barrier layer that is impermeable to water vapour and gases and, on both sides of the barrier layer, at least one plastic layer; it also relates to the use of the laminate films.

2. Background Art

Known from EP-A 0 845 350 are cold formable laminate films e.g. for so called blister packs or push through packs. Described there are plastic laminates containing a metal foil which are deepened in such a manner that a plurality of recesses or cups results. Shoulders are formed between the individual recesses. The shoulders run completely round each recess and form a flat shoulder area. The materials prepared this way form the base part of a blister pack. The base parts may be filled with substances i.e. the contents. Known contents for blister packs are e.g. tablets, capsules, dragees etc., from the pharmaceutical field, single or if desired having more than one in each recess. After that, the base part is closed off by sealing a lidding foil such as a metal foil—usefully aluminium foil or a laminate containing e.g. a sealing layer and a metal foil—on to the shoulders of the base part by means of the sealing layer.

The described laminate films exhibit good formability. The ratio of the recesses of a blister pack diameter to depth may be selected within a wide range i.e. the walls of the recesses may exhibit a low or high degree of steepness. There is however the need to have laminate films whose formability can be improved even further. Laminate films with much improved formability are in demand e.g. in the field of medical instruments and applicators.

BROAD DESCRIPTION OF THE INVENTION

The object of the present invention is to provide a laminate film for example for a push-through or blister pack e.g. for ampoules, capsules or tablets containing active pharmaceutical ingredients or diagnostics, powder or fluid to pasty substances from the field of pharmaceutica and cosmetics or for medical instruments and applicators having a superior protective action against the uptake of moisture and gases. In the case e.g. of push-through or blister packs it should thereby be possible to keep the size of the pack small in relation to the number of recesses, for example by steep walls in the recesses or as a whole by deeper forming. It should also be possible e.g. to provide smaller shoulder areas and, at the same time still ensure secure water vapour and moisture proof sealing between the base part and the lid part.

That objective is achieved by way of the invention in that the laminate film exhibits the a layered structure of the following kind and order:

a) a plastic layer in the form of a plastic film of a polyvinylchloride, polyester, polypropylene, polyamide, cyclo-olefin copolymer, cast film of polyvinylchloride or a polypropylene b) a metal foil and c) an oriented polyamide film of thickness 25 to 32 $\mu$m.

The plastic films a) and c) may—independent of each other—be a monofilm or a film laminate made up of two or more layers of the same or in the case of film a) also different plastics.

DETAILED DESCRIPTION OF THE INVENTION

In order to influence the forming behaviour and to keep the amount of material within economic limits, the plastic films a), which are processed to providing the present laminate films, are employed in practical and preferable thicknesses. E.g. non-stretched PVC-films exhibit a thickness of 60 to 100 $\mu$m. PVC films may be preferably uniaxially or biaxially stretched. Stretched films such as uniaxially or biaxially stretched PVC films may exhibit a thickness of 20 to 100 $\mu$m, usefully 30 to 60 $\mu$m, advantageously 30 to 40 $\mu$m. The polyester films may be uniaxially or biaxially stretched i.e. oriented and exhibit a thickness of 5 to 60 $\mu$m, usefully 12 to 32 $\mu$m and preferably 15 to 25 $\mu$m. The polypropylene films may be uniaxially or biaxially stretched i.e. oriented and exhibit a thickness of 12 to 30 $\mu$m, usefully 20 to 30 $\mu$m. The cycloolefin copolymer films may be uniaxially or biaxially stretched i.e. oriented and exhibit a thickness of 10 to 50 $\mu$m, usefully 15 to 40 $\mu$m and preferably 20 to 30 $\mu$m. If the plastic films a) are uniaxially or biaxially stretched i.e. oriented polyamide films, then they have a thickness e.g. of 5 to 40 $\mu$m, usefully 10 to 32 $\mu$m, preferably 15 to 30 $\mu$m. If the plastic film a) is a cast film of polyvinylchloride, then the thickness of the film is e.g. 60 to 100 $\mu$m, usefully 60 to 100 $\mu$m. If the plastic film a) is a cast film polypropylene, then the thickness of the film is e.g. 40 to 100 $\mu$m and usefully 40 60 $\mu$m. The metal foils b) may be e.g. 5 to 200 $\mu$m thick, usefully 20 to 100 $\mu$m, preferably 45 to 60 $\mu$m thick. The oriented polyamide films c) have a thickness of 25 to 32 $\mu$m, usefully 28 to 32 $\mu$m, preferably 30 $\mu$m thick.

The metal foil b) may e.g. be of steel, iron or copper. Preferred is an aluminium foil. The aluminium foil may usefully be an aluminium alloy, of the AlFeMn type such as AlFe1.5Mn, AlFeSi or AlFeSiMn, for example with a purity of 97.5% and higher, preferably 98.5% and higher. The metal foil is preferably an uninterrupted foil and, in particular, texture-free, homogeneous and fine grained (>4000 grains/mm$^2$).

The metal foil b), or the aluminium foil, is either not pre-treated with a primer or is pre-treated with a primer e.g. on one or both sides.

Suitable primers may e.g. be of the stove-lacquer type, epoxy resin or polyurethane type.

The cold-formable laminate films contain the plastic layer a) of thermoplastics of the following type viz., polyvinylchloride, polyester, polypropylene, polyamide, cycloolefin-copolyemer, cast PVC or polypropylene film. Suitable thermoplastics for producing these films are described below.

The PVC films are films based on chlorine-containing polymers, i.e. polymers of the vinylchloride, or vinyl plastics type, containing in their structure vinylchloride units such as copolymers of vinylchloride and vinylesters of aliphatic acids, copolymers of vinylchloride with vinyl esters of aliphatic acids, copolymers of vinylchloride with esters of acrylic or meth-acrylic acids or acrylnitrile, copolymers of vinylchloride and dein compounds and unsaturated dicarboxyl acids or their anhydrides, copolymers of vinylchloride and vinyl-chloride with unsaturated aldehydes, ketones etc., or polymers and copolymers of vinylidenchlorides with vinylchloride or other polymerisable compounds. The vinyl based thermoplastics may also be made soft in a known manner using primary or secondary softeners. The above mentioned materials containing vinylchlorides may also be employed for cast PVC films.

Films of PVC are at least uniaxially (oPVC) stretched or in some cases may be biaxially stretched. If the stretched PVC films are uniaxially stretched, their reduction in thickness is preferably in the range of 30 to 40%.

If the plastic films are of polyesters, then examples for the polyesters are polyalkylene-terephthalates or polyalkylene-isophthalates with alkylene groups or radicals with 2 to 10 carbon atoms or alkylene groups with 2 to 10 carbon atoms which are interrupted at least by one —O—, such as e.g. polyethylene-terphthalate, polypropylene-terephthalate, polybutyleneterephthalate (poly-tetra-methylene-terephthalate), poly-deca-methylene-terephthalate, poly-1.4.cyclo-hexyl-dimethylol-terephthalate or polyethylene-2.6-naphthalene-dicarboxylate or mixed polymers of polyalkylene-terephthalate and polyalkylene-isophthalate whereby the fraction of isophthalate amounts e.g. to 1 to 10 mol %, mixed polymers and terpolymers, block polymers and grafted modifications of the above mentioned substances. Other useful polymers are known in the field by the abbreviation PEN. Other polyesters are copolymers of terephthalic acid and a further polycarboxyl acid with at least one glycol. Useful in that connection are the copolymers of terephthalic acid, ethylene glycol and a further glycol. Preferred are glycol-modified polyesters, known in the field as PETG.

Further useful polyesters are polyalkylene-terephthalates with alkylene groups or radicals with 2 to 10 carbon atoms and polyalkylene-terephthalates with alkylene groups or radicals with 2 to 10 carbon atoms, which are interrupted by one or two —O—. Further preferred polyesters are polyalkylene-terephthalates with alkylene groups or radicals with 2 to 4 carbon atoms. Belonging to these polyethylene-terephthalates are also A-PET, PETP and the already mentioned PETG or G-PET. Very highly preferred are polyethylene-terephthalate films. The films of polyester are uniaxially or preferably biaxially oriented.

The polypropylene for films or coatings may be an isotactic, syndiotactic or atactic propylene or a mixture thereof. The polypropylene may be amorphous, partially crystalline or highly crystalline. Also block type copolymers or random copolymers of polypropylene may be employed. The average molecular weight may be e.g. less than 10,000 to 600,000 and higher. The polypropylene films may be uniaxially or biaxially stretched.

If the plastic films are polyamide films (PA), then the following belong to these polyamides e.g.: polyamide 6, a homopolymer of ε-caprolactum (polycaprolac- tam); polyamide 11, polyamide 12, a homopolymer of ω-laurinlactam (polylaurin-lactam); polyamide 6.6, a homopoly-condensate of hexamethylene-diamine and adipinic acid (polyhexamethylene-adipamide); polyamide 6.10, a homopoly-condensate of hexamethylene-diamine and adipinic cinic acid (polyhexamethylene-adapinamide); polyamide 6.10, a homopoly-condensate of hexa-methylene-diamine and dodecandic acid (polyhexamethylene-dodecanamide) or polyamide 6-3-T, a homopoly-condesate of trimethylhexamethylene-diamine and terephthalic acid (polytrimethyl-hexamethylene-terephthalamide), and mixtures thereof. The films of poly-amide are uniaxially or preferably biaxially oriented (oPA). The above mentioned polyamides may also be employed for the production of the oriented polyamide film c).

Cyclo-olefin copolymers describe thermoplastic olefinpolymers having an amorphous structure and which are essentially copolymers of ethylene and 2-norbornene or tetrahydrododecene. The content of norbornene in the ethylene-norbornene-cycloolefine copolymere may be e.g. in amounts from 12 to 80 mol-%, preferably 52 mol-%. The polymerisation can be controlled by metallocene-catalysts, polymerisation in solution and the pressure of the ethylene. The cyclo-olefin copolymers can be amorphous or can show cristallinity.

In order to control the sealing properties, the present laminate films may exhibit on one or both free sides, sealing layers such as sealing films or organic sealing coatings e.g. based on ethylene acrylic acid (EAA), polyolefins such as polyethylenes, polyacrylates, PVC resins, polyvinylidenchlorides, EVA, polyethylene-terephthalates, in particular the A-PET type, etc. The free sides, or at least one of the free sides, especially of the oriented polyester films may be coated with EVA (ethylene/vinylalcohol copolymer) or with an amorphous polyester sealing layer of the PET-A type. Examples of preferred sealing layers are organic sealing substances containing polyethylene or a film of e.g. 40 μm thick polypropylene.

The individual layers and in particular films i.e. the first plastic film against the metal foil and/or the second plastic film against the metal foil and any sealing films coming into contact with the free sides of the laminate film may be joined together by means of a bonding agent and/or laminate adhesive.

Preferred are cold formable laminate films which feature a layer structure featuring the following layers one on the top of the othter:

a) a plastic film of the stretched PVC type having a thickness 30 to 60 μm, b) a metal foil and c) an oriented polyamide film having a thickness of 25 to 32 μm.

Further preferred cold formable laminate films according to the invention are such featuring the following layers one on top of the other:

d) an oriented polyamide film having a thickness 25 to 32 μm, e) a metal foil and f) an oriented polyamide film having a thickness of 25 to 32 μm.

Examples of preferred laminate films exhibit the following layered structure:

a)/b)/c)

60 μmPVC/45 Al/30 oPA 30 oPVC/60 Al/30 oPA sealing layer/30oPA/60 Al/30 oPA

40 PP/30 oPA/60 Al/30 oPA 40 mPVC/45 Al/30 oPA where m stands for uniaxially stretched, o for biaxially stretched, PVC for polyvinylchloride film, PA for polyamide film, PP for a sealing layer of polypropylene and Al for aluminium foil, and the numbers for the thickness of the films or foils in μm.

The bonding of the individual layers, in particular the bonding of the films viz., the plastic films a) to the metal foil, and/or the polyamide film c) to the metal foil b), and any sealing films provided on the free sides of the laminate film may be effected using a primer, bonding agent and/or laminating adhesive or by extrusion coating by means of EAA.

Suitable laminate adhesives may be solvent-containing, solvent-free or water-containing. Examples of laminate adhesives are solvent-containing, solvent-free or water-containing acrylic adhesives or polyurethane adhesive systems. However, adhesives that are cured under the influence of radiated energy (e.g. UV; electron beams) may also be employed.

Preferred are polyurethane based laminate adhesives.

As bonding agent one may employ e.g. products based on di-isocyanate or aliphatic polyesters.

The laminating adhesive, like the bonding agent may be used e.g. in amounts of 0.5 to 10 g/m² preferably 2–8 g/m² and especially 3 to 6 g/m². The laminating adhesives, bonding agents or primers may also be employed in such quantities that they form layers that are at least 0.1 µm thick and at most 12 µm thick.

The surface of the metal foil b) may exhibit improved adhesion for adhesive or organic coatings or for an extrusion layer as a result of an appropriate pre-treatment (e.g. brushing, chromate treatment, ionising, ozone, corona, flame or plasma treatment). In order to promote and improve the bonding of organic coatings, bonding agents or laminating adhesives between the plastic film a) or the adhesion of cast films or the polyamide film c) extruded layers by means it is often useful to endow the films on the sides facing the adhesive or the extrudates with adequate surface tension. The increase in surface tension may be effected preferentially by the ionising, ozone, plasma, flame or corona treatment.

It may also be advantageous to join the plastic film a) or the polyamide film c), in each case to the metal foil b) only under the action of pressure and heat (hot calendering) without laminating adhesive and/or bonding agent.

The laminate films according to the invention may exhibit a sealing layer, such as a sealing film or an organic sealing coating of the above mentioned substances, on one or both free sides,—or on a side of the packaging container made from it which faces the contents, also known as the inner side, in some cases also on the side of the container which faces outwards also known as the outer side. The packaging container may be a base part of a push-through pack or another form of packaging. The different forms of packaging may exhibit a shoulder region and at least one recess therein. The sealing layer makes it possible to attach a lid to this container i.e. to the base part made of cold formed laminate film according to the present invention. Such lids may be for example lidding foils which are sealed on or adhesively bonded to the shoulders of the packaging container. Suitable lidding foils may contain a metal foil such as an aluminium foil and plastic films and/or organic coatings may be present on one or both sides of the metal foil. A paper layer or plastic/paper layer may be provided on the side of the lidding foil facing out from the packaging. An outermost layer in the form of a sealing layer may be provided at least on one side of the lidding foil. The base part and the lidding foil may be joined together via the sealing layer on the lidding foil or via the sealing layer on the base part, or via both sealing layers.

The laminate films may exhibit organic coatings and/or printed patterns on the inner and/or outer sides or facing the inner and/or outer sides—in each case referring to a packaging container made from the laminate film according to the invention. For example, the first and/or the second film of the laminate may exhibit a reverse image on the side facing the metal foil. A reverse image is especially suitable for transparent and translucent films. It is also possible to provide printed patterns on the outer side of the first and/or second film and, as the case requires, to cover this over with an organic coating. The outer and/or inner sides of the laminate may also be provided with an organic coating; a printed pattern may also be provided on the said organic coating and/or may be applied on the packaging line.

The present invention relates also to blister packs or push-through packs or base parts for these, and forms of packaging or shaped parts for medical instruments and applicators made from a cold formed laminate film according to the present invention.

The desired blister or push-through pack and in particular the base parts for these may be made from the laminate film according to the invention e.g. by means of a deepening process such as stretch drawing i.e. mechanical cold forming using a shaping tool. During stretch drawing the laminate film is held securely between the die and the press pad while the shaping tool forces the laminate film to adopt the desired shape by stretching it. The forming process may be performed e.g. cold or at slightly elevated temperatures of up to 50° C. The laminate films according to the invention, because of their behaviour during forming, may be used preferentially for blister and push-through packs with recesses having steeper side-wall regions. For example it is possible to achieve an inclination of 50 degrees of angle and higher up to almost 90 degrees of angle with respect to the horizontal surface of the laminate film. The ratio of diameter to depth of an individual recess may e.g. amount to 2.5 to 3.0. The push-through packs made from the laminate film according to the invention may have edge lengths e.g. of 30 to 200 mm, and the shoulder regions at the edges and between the recesses may e.g. have a width of 1 to 10 mm, preferably 3 to 6 mm. Such blister packs or push-through packs may exhibit e.g. 2 to 200 recesses, usefully 6 to 60 and advantageously 10 to 30 recesses, cups or compartments to accommodate e.g. tablets, capsules, ampoules, dragées, powders or liquid to pasty substances. The contents of the packaging may be from the field of cosmetics or pharmaceutical. A typical example is inhalation products. One recess is also capable of accommodating more than one single item—or instead of the above mentioned contents—e.g. small technical items. Shaped parts for forms of packaging exhibit e.g. one or some few recesses. Medical equipment or applicators such as inhalation devices and the like may be placed in these recesses.

During stretch forming the laminate film is subjected purely to elongation. As a result the plastic on the packaging facing outwards, as a rule the second plastic film in the laminate, exhibits a high degree of work hardening during the stretching operation and a high capacity for elongation. During the elongation of the second plastic film the aluminium foil is supported mechanically. Consequently, elongations can be achieved that are far beyond the limit of elongation exhibited by aluminium foil by itself.

The preferred biaxially stretched plastic films in the laminate films according to the invention enable isotropic flow of the laminate film to be achieved, and with that avoid the concent-ration of stress. As soon as the metal foil begins to neck during the forming operation, the plastic film is able to take on the load at that site as a result of the high degree of work hard-ening experienced during shaping. During stretch drawing the material of the laminate film flows preferably from the width than from the thickness. Further, the laminate film exhibits a high degree of elongation at fracture. A further preferred property of the laminate film according to the invention that can often be observed is a small degree of spring-back after forming.

The first plastic film a), which in packaging made from the laminate film according to the invention faces the inside and the product, is harmless from the physiological standpoint and may exhibit only a small or preferably no capacity for the uptake of gases and fluids. The first plastic film a) preferably exhibits high rigidity. A further preferred property of the plastic film a) is the mechanical support it affords the aluminium foil during elongation.

DETAILED DESCRIPTION OF THE DRAWINGS

FIG. 1 shows schematically the structure of the laminate film 1 according to the invention. The laminate film 1 exhibits a metal foil 11 which is clad on one side by the first plastic film a) 10 and on the other side by the oriented polyamide film c) 12. The arrows 13, 14 indicate that a primer, a bonding agent and/or a laminating adhesive may be provided between the individual layers. If the layers 10, 11 themselves can not be sealed or only inadequately sealed, a sealing layer in the form of an organic sealing coating or sealable film or coating may be provided on the free side 15 of the first plastic film 10 and/or on the free side 16 of the oriented polyamide film c) 12. As a rule the oriented polyamide film c) 12 forms the outside of the packaging while the first plastic film a) 10 faces the contents of the pack. This enables any cross-diffusion through the sealing seam to be reduced. The use of the laminate film in the reverse direction with the oriented polyamide film a) facing towards the inside of the packaging is possible.

What is claimed is:

1. A cold-formable film containing a barrier layer that is impermeable to water vapor and gases and, on both sides of the barrier layer, at least one plastic layer; the laminate film has a layered structure containing in the following kind and order:
   (a) a plastic layer in the form of a plastic film composed of a member selected from the group consisting of a polyvinylchloride, polyester, polypropylene, and cycloolefin-copolymer or of a cast film composed of a member selected from the group consisting of polyvinylchloride and polypropylene;
   (b) a metal foil; and
   (c) an oriented polyamide film that has a thickness of 25 to 32 μm.

2. The cold-formable laminate film according to claim 1, wherein the laminate film has a layered structure containing in the following kind and order:
   (a) a plastic film that is a stretched PVC film and has a thickness of 30 to 60 μm;
   (b) a metal foil; and
   (c) an oriented polyamide film that has a thickness of 25 to 32 μm.

3. The cold-formable laminate film according to claim 2, wherein each of the oriented polyester films of layer (c) and/or plastic layer (a) bears a sealing layer on the free side.

4. The cold-formable laminate film according to claim 3, wherein each of the oriented polyester films of layer (c) and/or plastic layer (a) bears a sealing layer of polypropylene on the free side.

5. The cold-formable laminate film of claim 4, wherein the sealing layer or layers have a thickness of 40 μm.

6. The cold-formable laminate film of claim 1, wherein each of the oriented polyester films of layer (c) and/or plastic layer (a) bears a sealing layer of polypropylene on the free side.

7. The cold-formable laminate film according to claim 1, wherein the plastic layer (a) is a nonstretched PVC film having a thickness of 60 to 100 μm, or a uniaxially or biaxially stretched PVC film having a thickness of 20 to 60 μm, or a uniaxially or biaxially stretched polyester film having a thickness of 5 to 60 μm, or a uniaxially or biaxially stretched cycloolefin-copolymer film having a thickness of 10 to 50 μm, or a cast film of polyvinylchloride having a film thickness of 60 to 150 μm, or of polypropylene having a film thickness of 40 to 100 μm.

8. The cold-formable laminate film according to claim 1, wherein the plastic layer (a) is a nonstretched PVC film having a thickness of 60 to 100 μm, or a uniaxially or biaxially stretched PVC film having a thickness of 30 to 60 μm, or a uniaxially or biaxially stretched polyester film having a thickness of 12 to 32 μm, or a uniaxially or biaxially stretched cycloolefin-copolymer film having a thickness of 15 to 40 μm, or a cast film of polyvinylchloride having a film thickness of 60 to 100 μm, or of polypropylene having a film thickness of 40 to 60 μm.

9. The cold-formable laminate film according to claim 1, wherein the plastic layer (a) is a nonstretched PVC film having a thickness of 60 to 100 μm or a uniaxially or biaxially stretched PVC film having a thickness of 30 to 40 μm, or a uniaxially or biaxially stretched polyester film having a thickness of 15 to 25 μm, or a uniaxially or biaxially stretched cycloolefin-copolymer film having a thickness of 20 to 30 μm, or a cast film of polyvinylchloride having a film thickness of 60 to 100 μm or of polypropylene having a film thickness of 40 to 60 μm.

10. The cold-formable laminate film according to claim 1, wherein the stretched oriented polyamide film (c) has a thickness of 28 to 32 μm.

11. The cold-formable laminate film according to claim 1, wherein the stretched oriented polyamide film (c) has a thickness of 30 μm.

12. The cold-formable laminate film according to claim 1, wherein the laminate films have a structure containing the following layers:

60 μmPVC/45 Al/30 oPA, or 30 oPVC/60 Al/30 oPA, or 40 mPVC/45 Al/30 oPA where m stands for uniaxially stretched, o for biaxially stretched, PVC for polyvinylchloride film, PA for polyamide film, and Al for aluminum foil, and the numbers for the thickness of the films in μm.

13. The cold-formable laminate film according to claim 1, wherein the oriented polyamide film (c) is uniaxially or biaxially oriented.

14. The cold-formable laminate film according to claim 1, wherein the film of polyvinylchloride, polyester, polypropylene, or cycloolefin-copolymers of the plastic film (a) is axially or biaxially oriented.

15. The cold-formable laminate film according to claim 1, wherein the stretched PVC film is uniaxially stretched.

16. The cold-formable film according to claim 1, wherein the stretched PVC film is uniaxially stretched with a reduction in thickness of 30 to 40 percent.

17. A base part of a blister pack or a push-through pack for tablets, capsules, ampoules, dragées, powders, or for liquid to pasty substances, and a form of packaging or shaped part for packaging medical instruments and applicators made from a cold formed laminate film according to claim 1.

* * * * *